(12) United States Patent
Honermann et al.

(10) Patent No.: US 8,827,180 B2
(45) Date of Patent: Sep. 9, 2014

(54) AGRICULTURAL SPRAYER BOOM HAVING ALIGNED MAST AND CENTER SECTION

(75) Inventors: John Paul Honermann, Benson, MN (US); Dane Kallevig, Willmar, MN (US); Scott David Reese, New London, MN (US)

(73) Assignee: CNH Industrial America LLC, New Holland, PA (US)

( * ) Notice: Subject to any disclaimer, the term of this patent is extended or adjusted under 35 U.S.C. 154(b) by 556 days.

(21) Appl. No.: 13/097,327

(22) Filed: Apr. 29, 2011

(65) Prior Publication Data
US 2012/0273591 A1 Nov. 1, 2012

(51) Int. Cl.
*B05B 1/20* (2006.01)
*A01M 7/00* (2006.01)

(52) U.S. Cl.
CPC ........... *A01M 7/0053* (2013.01); *A01M 7/0071* (2013.01)
USPC ........... 239/168; 239/159; 239/161; 239/166; 239/172

(58) Field of Classification Search
USPC .......... 239/159, 161, 164, 166, 167, 168, 172
See application file for complete search history.

(56) References Cited

U.S. PATENT DOCUMENTS

| | | | |
|---|---|---|---|
| 3,395,503 A | 8/1968 | Greenburg et al. | |
| 3,447,750 A | 6/1969 | Weston | |
| 3,927,832 A * | 12/1975 | Robison et al. | 239/168 |
| 4,372,492 A | 2/1983 | Blumenshine | |
| 4,650,117 A | 3/1987 | Dudley | |
| 6,047,901 A | 4/2000 | Pederson et al. | |
| 6,053,419 A | 4/2000 | Krohn et al. | |
| 6,119,963 A | 9/2000 | Bastin et al. | |
| 6,131,821 A | 10/2000 | Nejsum | |
| 6,234,407 B1 | 5/2001 | Knight et al. | |
| 6,315,218 B1 | 11/2001 | Guesdon | |
| 6,343,661 B1 | 2/2002 | Thompson et al. | |
| 6,402,051 B1 | 6/2002 | Humpal | |
| 6,491,234 B2 | 12/2002 | Beggs | |
| 7,152,811 B2 | 12/2006 | Gunlogson et al. | |
| D559,275 S | 1/2008 | Chahley et al. | |
| 7,395,663 B2 | 7/2008 | Thompson et al. | |
| 7,426,827 B2 | 9/2008 | Thompson et al. | |
| 7,429,003 B2 | 9/2008 | Thompson et al. | |
| 7,431,221 B2 | 10/2008 | Thompson et al. | |
| 7,631,817 B2 | 12/2009 | Thompson et al. | |
| 7,740,189 B2 | 6/2010 | Meyer et al. | |
| 7,913,930 B2 | 3/2011 | Theeuwen et al. | |
| 8,464,967 B2 * | 6/2013 | Kuphal et al. | 239/168 |
| 2010/0219264 A1 | 9/2010 | Meyer et al. | |

FOREIGN PATENT DOCUMENTS

| | | |
|---|---|---|
| DE | 3203210 | 12/1982 |
| EP | 0077110 | 4/1983 |
| EP | 0100127 | 2/1984 |
| EP | 0261028 | 3/1988 |
| EP | 2106694 | 10/2009 |
| FR | 2583261 | 12/1986 |
| FR | 2758434 | 7/1998 |

* cited by examiner

*Primary Examiner* — Steven J Ganey
(74) *Attorney, Agent, or Firm* — Rebecca L. Henkel

(57) ABSTRACT

An agricultural sprayer boom assembly is provided that includes a center section having a first frame configured to support left and right wing sections of the agricultural sprayer boom assembly. The agricultural sprayer boom assembly also includes a mast having a second frame coupled to the first frame, and configured to support the first frame during operation and transport. The first and second frames are aligned with one another along a direction of travel.

20 Claims, 5 Drawing Sheets

AGRICULTURAL SPRAYER BOOM HAVING ALIGNED MAST AND CENTER SECTION

BACKGROUND

The invention relates generally to agricultural equipment, and more specifically, to a sprayer boom having an aligned mast and center section.

Various types of agricultural vehicles (e.g., sprayers, floaters, applicators, etc.) are employed to deliver fertilizer, pesticides, herbicides, or other products to the surface of a field. Such agricultural vehicles typically include a boom configured to facilitate product delivery over wide swaths of soil. In certain configurations, the boom is suspended from a rear frame of the vehicle, and extends laterally outward from a center section. In such configurations, the center section is supported by a mast that is coupled to the agricultural vehicle by a linkage assembly. For example, the center section may be positioned behind the mast, and suspended from the mast via a linkage configured to facilitate rotation of the center section relative to the mast. Because the center section is positioned behind the mast, the weight of the boom applies a torque to the mast, the linkage assembly and the rear frame of the vehicle. As a result, the center section, the mast, the linkage assembly and the rear frame may employ stronger structural members and/or additional structural members to resist the torque, thereby increasing the weight of the components. Consequently, larger/more powerful vehicles are employed to accommodate the increased load. Unfortunately, the acquisition and operating costs of the larger/more powerful vehicles significantly increases the overhead associated with crop production. In addition, the increased vehicle load may result in undesirable soil compaction.

BRIEF DESCRIPTION

The present invention provides an agricultural sprayer boom assembly including a center section having a first frame configured to support left and right wing sections of the agricultural sprayer boom assembly. The agricultural sprayer boom assembly also includes a mast having a second frame coupled to the first frame, and configured to support the first frame during operation and transport. The first and second frames are aligned with one another along a direction of travel. As a result, the torque applied to the mast by the center section is substantially less than the torque applied by a center section positioned behind the mast. Consequently, the center section and the mast may employ lighter structural members and/or fewer structural members to resist the torque, thereby decreasing the weight of the boom assembly. The lighter weight reduces soil compaction and/or facilitates the use of smaller/less powerful vehicles to transport the boom assembly across a field, thereby reducing overhead costs associated with crop production.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
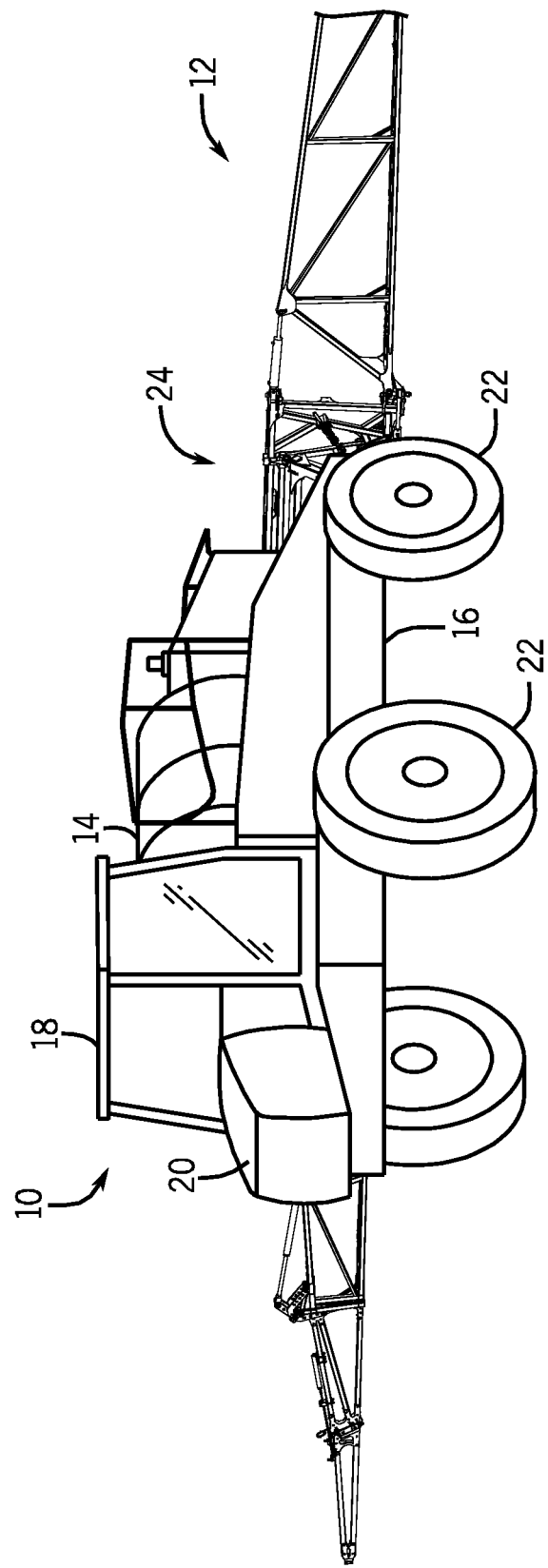
FIG. 1 is a perspective view of an embodiment of an agricultural vehicle having a boom assembly that may include an aligned mast and center section.

FIG. 1 is a perspective view of an embodiment of an agricultural vehicle 10 having a boom assembly 12 that may include an aligned mast and center section. The agricultural vehicle 10 includes a tank 14 where materials, such as fertilizer, pesticide, herbicide, and/or other products, are stored for distribution to a field. As illustrated, the agricultural vehicle 10 also includes a frame 16, a cab 18, and a hood 20. The frame 16 provides structural support for the cab 18, the hood 20, and the tank 14. Furthermore, the cab 18 provides an enclosed space for an operator, and the hood 20 houses the engine and/or systems configured to facilitate operation of the vehicle 10. The agricultural vehicle 10 also includes wheels 22 configured to support the frame 16, and to facilitate movement of the vehicle across the field.

The boom assembly 12 includes a mast 24 that supports the weight of the boom, and facilitates rotation of the boom relative to the vehicle 10. The mast 24, in turn, is coupled to the agricultural vehicle 10 by a linkage assembly (e.g., parallel linkage, four-bar linkage, etc.) that facilitates height adjustment of the boom relative to the soil surface. When distributing product, the boom extends laterally outward from the agricultural vehicle 10 to cover wide swaths of soil, as illustrated. However, to facilitate transport, each lateral wing of the boom assembly 12 may be folded forwardly or rearwardly into a transport position, thereby reducing the overall width of the vehicle. As discussed in detail below, the boom assembly 12 includes a center section having a frame configured to support left and right wing sections of the agricultural sprayer boom. In addition, the mast 24 includes a frame coupled to the center section frame, and configured to support the center section during operation and transport. In the illustrated embodiment, the center section frame and the mast frame are aligned with one another along a direction of travel. As a result, the torque applied to the mast by the center section is substantially less than the torque applied by a center section positioned behind the mast. Consequently, the center section and the mast may employ lighter structural members and/or fewer structural members to resist the torque, thereby decreasing the weight of the boom assembly 12. The reduced weight of the boom assembly 12 decreases the load applied to the vehicle 10, thereby reducing soil compaction and/or facilitating the use of smaller/less powerful vehicles. Due to the decreased acquisition and operating costs of the smaller/less powerful vehicles, the overhead associated with crop production may be significantly reduced.

Figure 2:
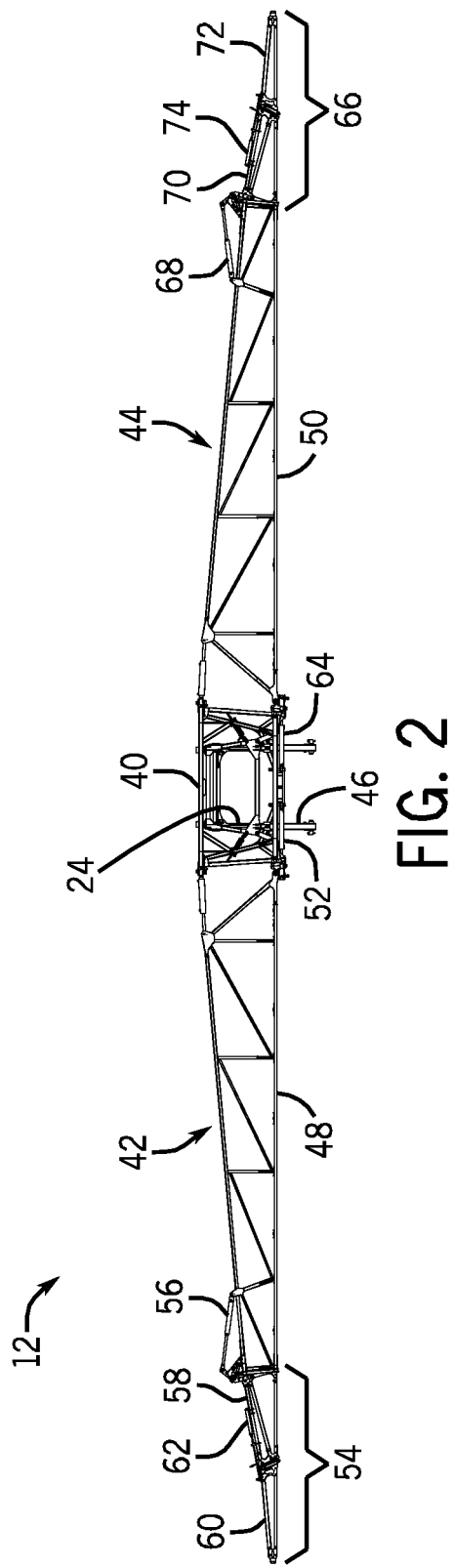
FIG. 2 is a front view of an embodiment of a boom assembly that may be employed within the agricultural vehicle of FIG. 1.

FIG. 2 is a front view of an embodiment of a boom assembly 12 that may be employed within the agricultural vehicle 10 of FIG. 1. As illustrated, the boom assembly 12 includes a center section 40, a first (e.g., left) wing assembly 42, and a second (e.g., right) wing assembly 44. In the illustrated embodiment, the center section 40 is configured to couple to the frame 16 of the agricultural vehicle 10 via the mast 24 and a linkage assembly 46. In addition, the center section 40 is configured to support the wing assemblies 42 and 44 during operation and transport. As illustrated, the wing assemblies 42 and 44 are coupled to opposite lateral sides of the center section 40. Specifically, an inner section 48 of the first wing assembly 42 is pivotally coupled to one lateral side of the center section 40, and an inner section 50 of the second wing assembly 44 is coupled to an opposite lateral side of the center section 40. In this configuration, the wing assemblies 42 and 44 may be folded forwardly or rearwardly from the illustrated working position to a transport position that reduces the overall width of the vehicle.

In the illustrated embodiment, the first wing assembly 42 includes an actuating cylinder 52 (e.g., electromechanical actuator, hydraulic cylinder and/or pneumatic cylinder) extending between the inner section 48 and the center section 40. The cylinder 52 may be fluidly coupled to a fluid power supply that provides pressurized fluid to drive a piston rod to extend and retract. It should be appreciated that the fluid power supply may be hydraulic or pneumatic, thereby powering a corresponding hydraulic or pneumatic cylinder 52. In the illustrated embodiment, extension of the piston rod drives the first wing assembly 42 into the illustrated working position, and retraction of the piston rod drives the first wing assembly 42 into the transport position. That is, retraction of the piston rod induces the first wing assembly 42 to rotate forwardly about a pivot, thereby reducing the overall width of the vehicle 10.

The first wing assembly 42 also includes an outer portion 54 having an actuating cylinder 56. As illustrated, the outer portion 54 is coupled to the inner section 48 by a pivotal joint. Like the cylinder 52, the actuating cylinder 56 may be a hydraulic and/or pneumatic cylinder configured to displace a piston rod extending from the cylinder 56. Retracting the piston rod of the cylinder 56 will cause the outer portion 54 to rotate upwardly from the illustrated product distribution/working position to a transport position. However, it should be appreciated that alternative embodiments may employ outer portions configured to rotate forwardly or rearwardly to the transport position. In the illustrated embodiment, the outer portion 54 includes an outer section 58, a breakaway section 60, and a biasing member 62. The outer section 58 extends between the inner section 48 and the breakaway section 60. The breakaway section 60 is pivotally coupled to the outer section 58 by a joint, and the biasing member 62 is configured to urge the breakaway section 60 toward the illustrated working position. In this configuration, contact between the breakaway section 60 and an obstruction will drive the breakaway section to rotate. After the boom has passed the obstruction, the biasing member 62 will urge the breakaway section back to the working position.

The structure of the second wing assembly 44 is similar to the structure of the first wing assembly 42. Specifically, the second wing assembly 44 includes an actuating cylinder 64 (e.g., electromechanical actuator, hydraulic cylinder and/or pneumatic cylinder) extending between the inner section 50 and the center section 40. The cylinder 64 may be fluidly coupled to a fluid power supply that provides pressurized fluid to drive a piston rod to extend and retract. It should be appreciated that the fluid power supply may be hydraulic or pneumatic, thereby powering a corresponding hydraulic or pneumatic cylinder 64. In the illustrated embodiment, extension of the piston rod drives the second wing assembly 44 into the illustrated working position, and retraction of the piston rod drives the second wing assembly 44 into the transport position. That is, retraction of the piston rod induces the second wing assembly 44 to rotate forwardly about a pivot, thereby reducing the overall width of the vehicle 10.

The second wing assembly 44 also includes an outer portion 66 having an actuating cylinder 68. As illustrated, the outer portion 66 is coupled to the inner section 50 by a pivotal joint. Like the cylinder 64, the actuating cylinder 68 may be a hydraulic and/or pneumatic cylinder configured to displace a piston rod extending from the cylinder 68. Retracting the piston rod of the cylinder 68 will cause the outer portion 66 to rotate upwardly from the illustrated product distribution/working position to a transport position. However, it should be appreciated that alternative embodiments may employ outer portions configured to rotate forwardly or rearwardly to the transport position. In the illustrated embodiment, the outer portion 66 includes an outer section 70, a breakaway section 72, and a biasing member 74. The outer section 70 extends between the inner section 50 and the breakaway section 72. The breakaway section 72 is pivotally coupled to the outer section 70 by a joint, and the biasing member 74 is configured to urge the breakaway section 72 toward the illustrated working position. In this configuration, contact between the breakaway section 72 and an obstruction will drive the breakaway section to rotate. After the boom has passed the obstruction, the biasing member 74 will urge the breakaway section back to the working position.

As discussed in detail below, a center section frame is aligned with a mast frame along the direction of travel (i.e., in a fore/aft direction). As a result of this configuration, the torque applied to the mast by the boom is substantially less than the torque applied by a boom having a center section positioned behind the mast. Consequently, the center section, the mast, the linkage assembly and the vehicle frame may employ lighter structural members and/or fewer structural members to resist the torque, thereby decreasing the weight of the boom assembly and/or the vehicle frame. As a result, soil compaction will be reduced and/or smaller/less powerful vehicles may be employed to transport the boom assembly across a field. Due to the reduced acquisition and operating costs of the smaller/less powerful vehicles, the overhead associated with crop production may be significantly decreased.

Figure 3:
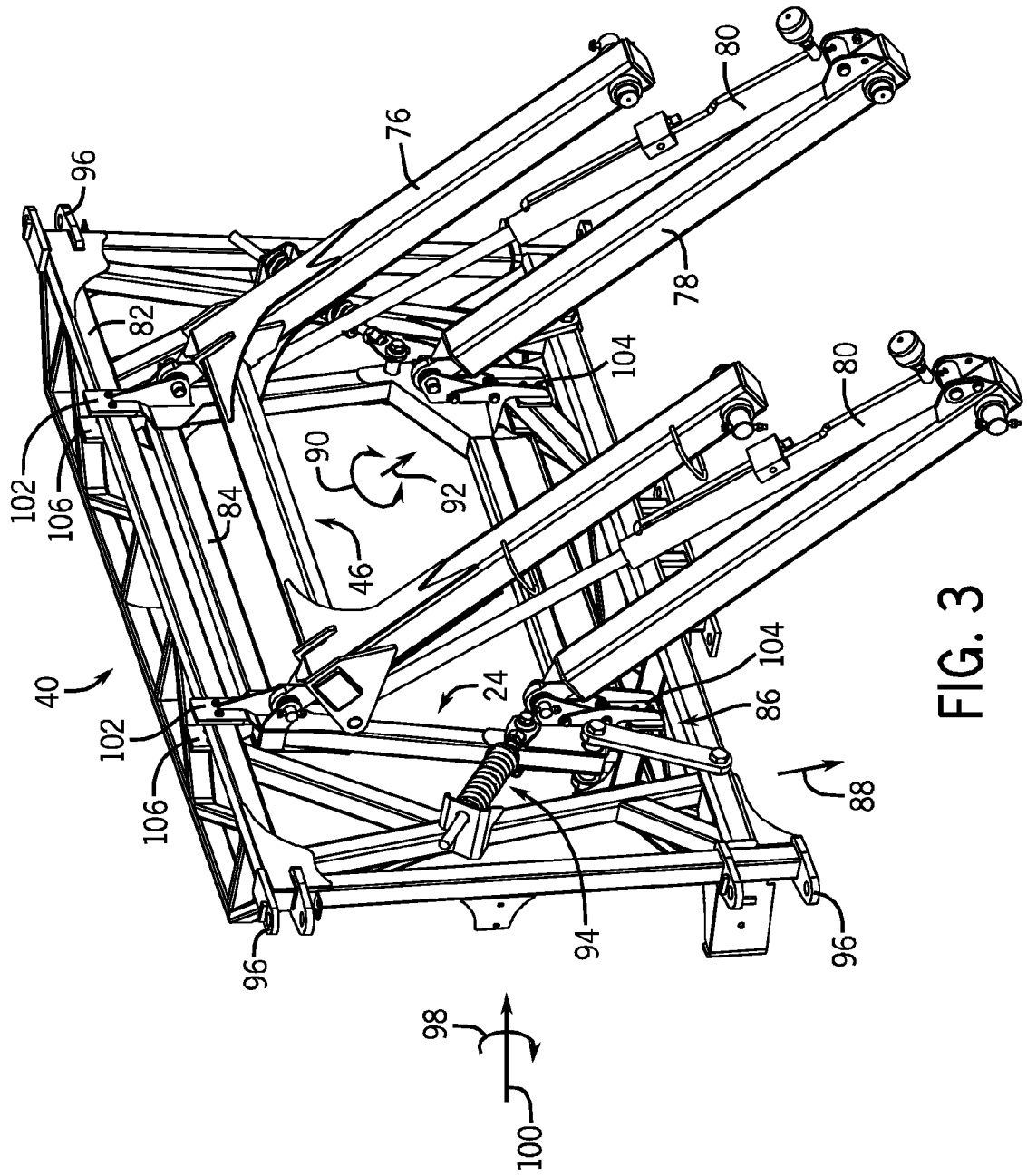
FIG. 3 is a perspective view of an embodiment of a mast and a center section having respective frames aligned with one another along a direction of travel.

FIG. 3 is a perspective view of an embodiment of a mast 24 and a center section 40 having respective frames aligned with one another along a direction of travel. As previously discussed, a linkage assembly 46 extends between a mobile chassis (e.g., the frame 16 of the agricultural vehicle 10) and the mast 24 to support the mast, and to facilitate height adjustment of the mast relative to the soil surface. In the illustrated embodiment, the linkage assembly 46 includes an upper support 76, a lower support 78 and actuating cylinders 80. The upper support 76 is pivotally coupled to an upper portion of the mast 24, and the lower support 78 is pivotally coupled to a lower portion of the mast 24. Furthermore, each actuating cylinder 80 extends between a distal end of the lower support 78 and a base of the upper support 76. In this configuration, extension of the cylinders 80 will induce the supports 76 and 78 to rotate downwardly with respect to the mast 24, thereby raising the mast 24 relative to the frame 16. Conversely, retraction of the cylinders 80 will induce the supports 76 and 78 to rotate upwardly, thereby lowering the mast 24 relative to the frame 16. In this manner, the height of the boom relative to the soil surface may be particularly adjusted to accommodate various crops, soil conditions and/or delivered products, for example.

In the illustrated embodiment, the center section 40 includes a frame 82 configured to support the left and right wing assemblies of the agricultural spray boom assembly 12. In addition, the mast 24 includes a frame 84 configured to support the center section frame 82 during operation and transport. As illustrated, the center section frame 82 is coupled to the mast frame 84 via a linkage 86 configured to transfer the downward load 88 of the center section 40 to the mast 24. Specifically, the weight of the left and right wing assemblies 42 and 44 is supported by the center section 40, and the center section 40 transfers the load to the mast 24 via the linkage 86. The mast 24, in turn, transfers the load to the vehicle frame 16 via the linkage assembly 46, thereby suspending the boom assembly 12 above the soil surface.

Furthermore, the linkage 86 facilitates rotation of the center section 40 relative to the mast 24 in a direction 90 (i.e., about an axis parallel to the direction of travel 92). As a result, the boom may remain substantially parallel to the soil surface despite movement of the vehicle 10. For example, if the vehicle 10 tilts to one side due to variations in the terrain, the boom may rotate about the mast to remain substantially level relative to the soil surface. Consequently, a height of each spray nozzle may be maintained at a desired distance above the soil surface. In the illustrated embodiment, the boom assembly 12 includes a suspension 94 configured to damp rotary oscillations of the center section 40 relative to the mast 24, thereby providing a stable platform for the spray nozzles.

In the illustrated embodiment, the center section 40 includes multiple supports 96 coupled to the frame 82, and configured to rotatably couple the left and right wing assemblies to the center section 40. For example, each support 96 may include openings configured to receive a pin coupled to a respective wing assembly. In this configuration, the supports 96 will bear the downward load 88 of the wing assemblies, while facilitating rotation of the wing assemblies between the working position and the transport position. As previously discussed, the wing assemblies are configured to rotate forwardly to the transport position. While in the transport position, the wing assemblies will urge the center section 40 to rotate in a direction 98 about an axis 100 perpendicular to the direction of travel 92. Consequently, the mast 24 includes multiple guides coupled to the frame 84, and configured to interface with the center section frame 82 to block rotation of the center section 40 relative to the mast 24 about the axis 100. In the illustrated embodiment, the center section 40 includes upper guides 102 coupled to an upper portion of the frame 82, and lower guides 104 coupled to a lower portion of the frame 82. As illustrated, the guides 102 and 104 include liners 106 configured to facilitate lateral movement of the center section frame 82 as the center section 40 rotates relative to the mast 24 in the direction 90. Accordingly, the guides 102 and 104 block rotation of the center section 40 in the direction 98, while enabling the center section 40 to rotate in the direction 90.

In the illustrated embodiment, the center section frame 82 includes multiple structural elements (e.g., rectangular tubes) aligned with a first plane substantially perpendicular to the direction of travel 92, and the mast frame 84 includes multiple structural elements (e.g., rectangular tubes) aligned with a second plane substantially perpendicular to the direction of travel 92. As illustrated, the first and second planes are aligned with one another along the direction of travel 92, thereby aligning the center section frame and the mast frame. By aligning the center section with the mast in the fore/aft direction, the torque applied to the mast by the boom is substantially less than the torque applied by a boom having a center section positioned behind the mast. Consequently, the center section, the mast, the linkage assembly and the vehicle frame may employ lighter structural members and/or fewer structural members to resist the torque, thereby decreasing the weight of the boom assembly and/or the vehicle frame. As a result, soil compaction will be reduced and/or smaller/less powerful vehicles may be employed to transport the boom assembly across a field. Due to the reduced acquisition and operating costs of the smaller/less powerful vehicles, the overhead associated with crop production may be significantly decreased.

Figure 4:
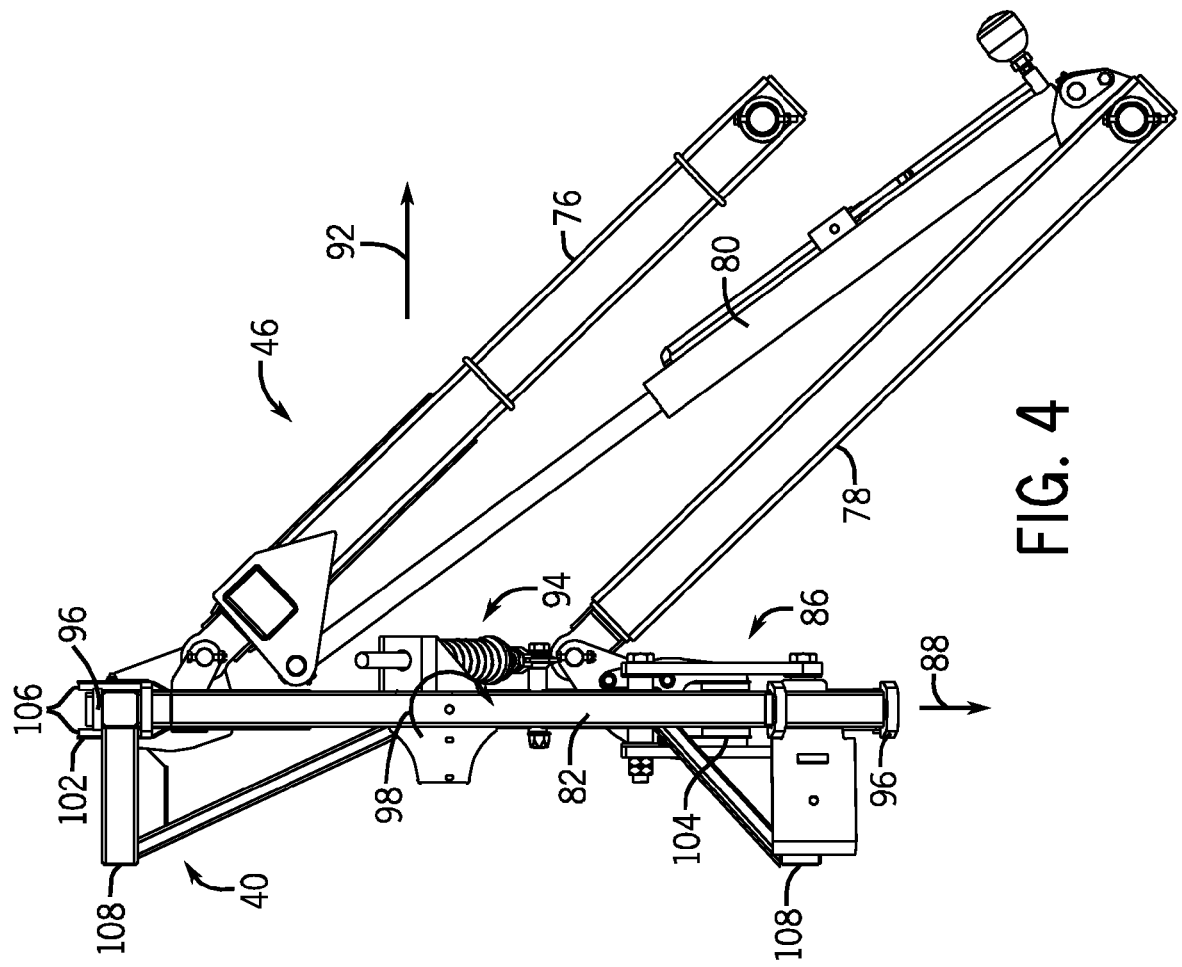
FIG. 4 is a side view of the mast and center section shown in FIG. 3.

FIG. 4 is a side view of the mast and center section shown in FIG. 3. In the illustrated embodiment, the center section 40 includes supports 108 coupled to upper and lower portions of the frame 82, and configured to provide enhanced structural rigidity. As previously discussed, the wing assemblies urge the center section 40 to rotate in the direction 98 while the wing assemblies are in the transport position. Furthermore, the guides 102 and 104 block rotation of the center section 40 relative to the mast 24, thereby inducing a torque within the center section frame 82. The supports 108 are configured to resist the torque, thereby enabling the center section 40 to support the wing assemblies while the wing assemblies are in the transport position.

As previously discussed, the center section frame 82 is aligned with the mast frame 84 along the direction of travel 92. In the illustrated embodiment, the mast frame 84 does not extend past the center section frame 82 along an axis parallel to the direction of travel 92. Consequently, the overall vehicle length may be significantly reduced, as compared to configurations in which the center section is positioned behind the mast. Furthermore, due to the alignment of the mast frame and center section frame, the overhung load on the linkage assembly 46 and/or the vehicle chassis may be significantly reduced. Therefore, the linkage assembly and/or vehicle chassis may include lighter and/or fewer structural elements, thereby reducing the overall weight of the agricultural vehicle.

Figure 5:
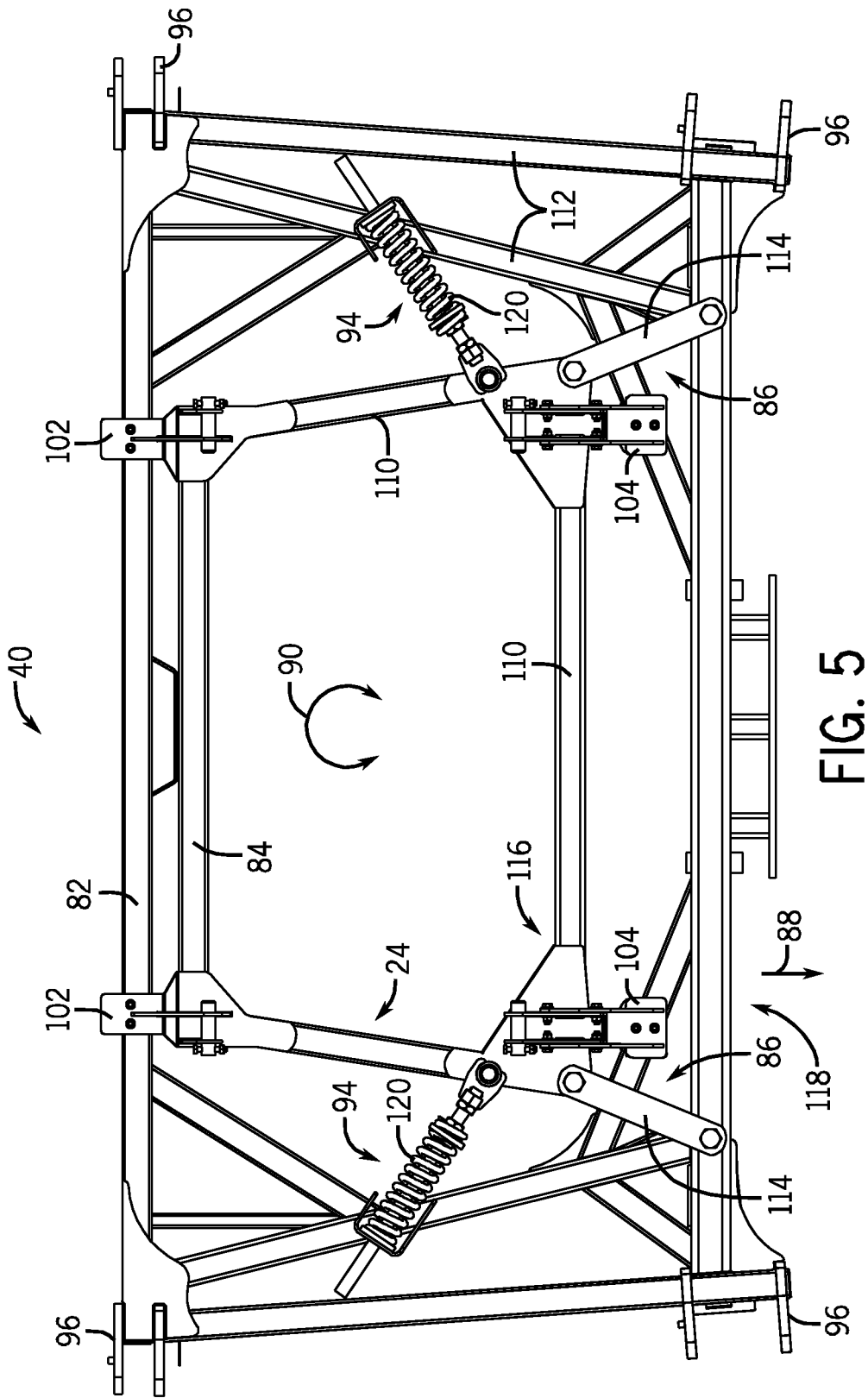
FIG. 5 is a front view of the mast and center section shown in FIG. 3.

FIG. 5 is a front view of the mast and center section shown in FIG. 3. As illustrated, the center section frame 82 is disposed about the mast frame 84, and the frames are aligned with one another along the direction of travel. In the illustrated embodiment, the mast frame 84 includes multiple structural tubes 110 having substantially rectangular cross sections, and the center section frame 82 includes multiple structural tubes 112 having substantially rectangular cross sections. The structural tubes 112 of the center section frame 82 are aligned with a first plane substantially perpendicular to the direction of travel, and the structural tubes 110 of the mast frame 84 are aligned with a second plane substantially perpendicular to the direction of travel. In the illustrated embodiment, the first and second planes are aligned with one another along the direction of travel 92, thereby aligning the center section frame and the mast frame in a fore/aft direction.

As previously discussed, the center section frame 82 is coupled to the mast frame 84 via a linkage 86 configured to transfer the downward load 88 of the center section 40 to the mast 24. The linkage 86 includes multiple links 114 extending from a lower portion 116 of the mast frame 84 to a lower portion 118 of the center section frame 82. The linkage 86 facilitates rotation of the center section 40 relative to the mast 24 in a direction 90. As a result, the boom may remain substantially parallel to the soil surface despite movement of the vehicle 10. Furthermore, the suspension 94 includes multiple springs 120 extending between the center section frame 82 and the mast frame 84. The springs 120 are configured to damp rotary oscillations of the center section 40 relative to the mast 24, thereby providing a stable platform for the spray nozzles.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural sprayer boom assembly, comprising:
   a center section having a first frame configured to support left and right wing sections of the agricultural sprayer boom assembly, wherein the first frame comprises a first structural element extending transversely across the first frame relative to the left and right wing sections; and
   a mast having a second frame coupled to the first frame, and configured to support the first frame during operation and transport, wherein the second frame comprises a second structural element extending transversely across the second frame relative to the left and right wing sections, and the first and second structural elements are aligned with one another along a direction of travel.

2. The agricultural sprayer boom assembly of claim 1, wherein the first frame is disposed about the second frame.

3. The agricultural sprayer boom assembly of claim 1, wherein the second frame is coupled to the first frame via a linkage that facilitates rotation of the center section relative to the mast about an axis substantially parallel to the direction of travel.

4. The agricultural sprayer boom assembly of claim 3, comprising a suspension configured to damp rotary oscillations of the center section relative to the mast.

5. The agricultural sprayer boom assembly of claim 3, wherein the mast comprises a plurality of guides coupled to the second frame, and configured to interface with the first frame to block rotation of the center section relative to the mast about an axis substantially perpendicular to the direction of travel.

6. The agricultural sprayer boom assembly of claim 1, comprising a linkage assembly configured to couple the mast to a mobile chassis, and to facilitate height adjustment of the mast relative to the mobile chassis.

7. The agricultural sprayer boom assembly of claim 1, wherein the center section comprises a plurality of supports coupled to the first frame, and configured to rotatably couple the left and right wing sections to the center section.

8. The agricultural sprayer boom assembly of claim 1, wherein the first structural element comprises a first structural tube having a substantially rectangular cross section, the second structural element comprises a second structural tube having a substantially rectangular cross section, or a combination thereof.

9. The agricultural sprayer boom assembly of claim 1, wherein the second frame does not extend past the first frame along an axis substantially parallel to the direction of travel.

10. An agricultural sprayer boom assembly, comprising:
    a center section having a first frame including a first plurality of structural elements aligned with a first plane substantially perpendicular to a direction of travel, wherein the first frame is configured to support left and right wing sections of the agricultural sprayer boom assembly, and each of the first plurality of structural elements extends transversely across the first frame relative to the left and right wing sections; and
    a mast having a second frame including a second plurality of structural elements aligned with a second plane substantially perpendicular to the direction of travel, wherein the second frame is coupled to the first frame, each of the second plurality of structural elements extends transversely across the second frame relative to the left and right wing sections, the second frame is configured to support the first frame during operation and transport, and the first and second planes are aligned with one another along the direction of travel.

11. The agricultural sprayer boom assembly of claim 10, wherein the first frame is disposed about the second frame.

12. The agricultural sprayer boom assembly of claim 10, comprising a linkage assembly configured to couple the mast to a mobile chassis, and to facilitate height adjustment of the mast relative to the mobile chassis.

13. The agricultural sprayer boom assembly of claim 10, wherein the second frame is coupled to the first frame via a linkage that facilitates rotation of the center section relative to the mast about an axis substantially parallel to the direction of travel.

14. The agricultural sprayer boom assembly of claim 13, comprising a suspension configured to damp rotary oscillations of the center section relative to the mast.

15. The agricultural sprayer boom assembly of claim 10, wherein the second frame does not extend past the first frame along an axis substantially parallel to the direction of travel.

16. An agricultural sprayer boom assembly, comprising:
    a center section having a first frame configured to support left and right wing sections of the agricultural sprayer boom assembly, wherein the first frame comprises a first plurality of structural elements extending transversely across the first frame relative to the left and right wing sections; and
    a mast having a second frame coupled to the first frame, and configured to support the first frame during operation and transport, wherein the second frame comprises a second plurality of structural elements extending transversely across the second frame relative to the left and right wing sections, the first frame is disposed about the second frame, and the first and second pluralities of structural elements are aligned with one another along a direction of travel.

17. The agricultural sprayer boom assembly of claim 16, wherein the second frame is coupled to the first frame via a linkage that facilitates rotation of the center section relative to the mast about an axis substantially parallel to the direction of travel.

18. The agricultural sprayer boom assembly of claim 17, comprising a suspension configured to damp rotary oscillations of the center section relative to the mast.

19. The agricultural sprayer boom assembly of claim 17, wherein the mast comprises a plurality of guides coupled to the second frame, and configured to interface with the first frame to block rotation of the center section relative to the mast about an axis substantially perpendicular to the direction of travel.

20. The agricultural sprayer boom assembly of claim 16, wherein the second frame does not extend past the first frame along an axis substantially parallel to the direction of travel.

* * * * *